United States Patent
Ishikawa et al.

(10) Patent No.: US 6,414,733 B1
(45) Date of Patent: Jul. 2, 2002

(54) COLOR LIQUID CRYSTAL DISPLAY WITH A SHIELDING MEMBER BEING ARRANGED BETWEEN SEALING MEMBER AND DISPLAY ZONE

(75) Inventors: Keizo Ishikawa; Takehide Kishimoto; Hideaki Yamagata; Takashi Nishimoto, all of Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 09/499,153

(22) Filed: Feb. 7, 2000

(30) Foreign Application Priority Data

Feb. 8, 1999 (JP) ............................................. 11-30016
Jan. 26, 2000 (JP) ........................................... 2000-21734

(51) Int. Cl.[7] .................. G02F 1/1333; G02F 1/1339; G02F 1/1335
(52) U.S. Cl. ..................... 349/110; 349/153; 349/106
(58) Field of Search .................... 349/106, 110, 349/153, 155, 156

(56) References Cited

U.S. PATENT DOCUMENTS

| | | | | |
|---|---|---|---|---|
| 4,966,442 A | * | 10/1990 | Ono et al. | 350/339 R |
| 5,828,434 A | * | 10/1998 | Koden et al. | 349/148 |
| 5,880,803 A | * | 3/1999 | Tamai et al. | 349/156 |
| 5,917,572 A | * | 6/1999 | Kurauchi et al. | 349/156 |
| 5,946,070 A | * | 8/1999 | Kohama et al. | 349/156 |
| 5,978,061 A | * | 11/1999 | Miyazaki et al. | 349/155 |
| 5,995,191 A | * | 11/1999 | Tamai et al. | 349/155 |
| 6,067,144 A | * | 5/2000 | Murouchi | 349/156 |
| 6,072,557 A | * | 6/2000 | Kishimoto | 349/156 |
| 6,115,098 A | * | 9/2000 | Kume et al. | 349/156 |
| 6,140,988 A | * | 10/2000 | Yamada | 345/88 |

FOREIGN PATENT DOCUMENTS

| | | | | |
|---|---|---|---|---|
| JP | 08-254692 A | * | 10/1996 | |
| JP | 08328024 | | 12/1996 | ......... G02F/1/1339 |
| JP | 10-90689 A | * | 4/1998 | |
| JP | 10-197880 A | * | 7/1998 | |
| JP | 11237621 | | 8/1999 | ......... G02F/1/1335 |
| JP | 11-344700 A | * | 12/1999 | |

* cited by examiner

Primary Examiner—William L. Sikes
Assistant Examiner—Tarifur R. Chowdhury
(74) Attorney, Agent, or Firm—Ladas & Parry

(57) ABSTRACT

Disclosed is a color liquid crystal display in which a shielding member is disposed between a sealing member and a display zone to prevent the liquid crystal layer from being contaminated with liquid crystal-contaminants from the sealing member wherein the shielding member is formed of a material which does not adversely affect the liquid crystal layer. The color liquid crystal display comprises at least a color filter substrate provided with a colored layer with plural colors formed into a predetermined pattern in a display zone on a transparent substrate, a counter electrode substrate disposed opposite to and with a predetermined gap from the color filter substrate, a sealing member disposed outside of the display zone to seal the gap formed between both substrates, a liquid crystal layer formed by filling a liquid crystal material in the gap formed between both substrates and sealed by the sealing member and a shielding member disposed between the sealing member and the display zone and formed of a material which works such that the voltage retention and residual DC ($\Delta E$) of the liquid crystal material after the impurity-extraction treatment is 80% or more and 0.5 V or less respectively to prevent the liquid crystal material contained in the liquid crystal layer from being contaminated with contaminants from the sealing member.

13 Claims, 7 Drawing Sheets

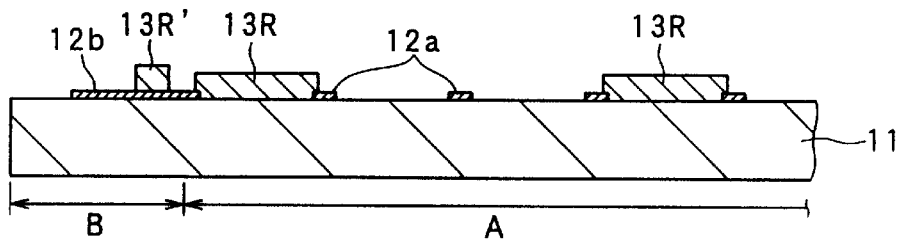
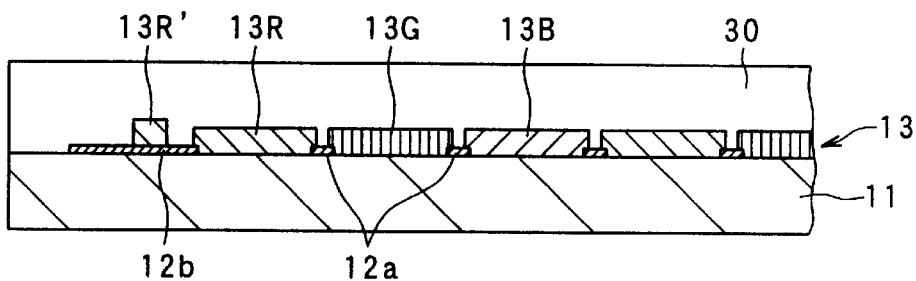
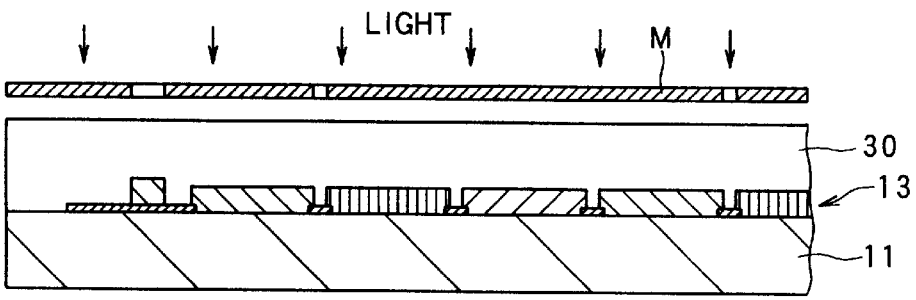
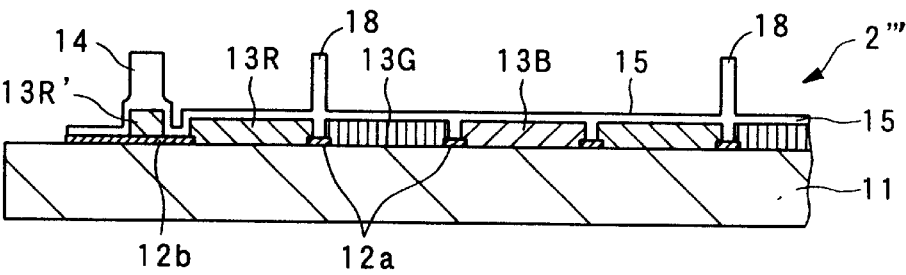

COLOR LIQUID CRYSTAL DISPLAY WITH A SHIELDING MEMBER BEING ARRANGED BETWEEN SEALING MEMBER AND DISPLAY ZONE

BACKGROUND OF THE INVENTION

The present invention relates to a color liquid crystal display and, particularly, to a color liquid crystal display which has high display qualities and is highly reliable.

In recent years, color liquid crystal displays have attracted remarkable attention as flat displays. One example of these color liquid crystal displays has a schematic structure comprising a color filter substrate including a black matrix, a colored layer consisting of plural colors (three primary colors: red (R), green (G) and blue (B)), a transparent electrode and an oriented layer, a counter electrode substrate including a thin film transistor (TFT element), a pixel electrode and an oriented layer, and a liquid crystal layer formed by opposing these both substrates to each other with a predetermined gap between them, sealing by a sealing member and filling a liquid crystal material in the gap.

In such a color liquid crystal display, the aforementioned gap is just the thickness of the liquid crystal. The thickness of the above liquid crystal layer, namely the distance between the color filter substrate and the counter electrode substrate must be kept strictly constant to enable exhibition of high display efficiencies which is required to a color liquid crystal display, including high speed responsibility, high contrast ration and wide angle of view. This is the reason why the following settings are taken. Specifically, before the color filter substrate and the counter electrode substrate are applied to each other, glass beads or plastic beads with a predetermined diameter and uniform grain diameter are dispersed as a spacer in either one of the color filter substrate and the counter electrode substrate. Thereafter, both substrates are applied to each other and sealed by a sealing member. Thus, the distance of the gap between both substrates, namely the thickness of the liquid crystal layer is set corresponding to the diameter of the glass beads or plastic beads.

However, because a curable synthetic resin is usually used as the sealing member, the generation of reaction gas and the elution of a solvent are caused in a curing process after the color filter substrate and the counter electrode substrate are applied to each other and sealed. There is the case where the liquid crystal layer is thereby contaminated and hence produces display nonuniformity, leading to reduced display qualities.

In order to solve such a problem, a color liquid crystal display is proposed in which an organic film is formed inside of the sealing member to prevent the liquid crystal layer from being contaminated with the reaction gas and eluents from the sealing member (Japanese Patent Application Laid-Open (JP-A) No. H8-328024).

However, when the organic film itself contains substances which contaminate the liquid crystal layer, the problem, such as the aforementioned display nonuniformity, which deteriorates the display qualities of the liquid crystal layer cannot be solved.

Also, in such a color liquid crystal display as mentioned above, a step of forming the organic film by a photolithographic method is required in addition to a step of forming the colored layer comprising the black matrix and three colors of R, G and B. This poses the problems of, for example, complicated steps and reduced throughput and yield. Moreover, in the case of using glass beads or plastic beads as a spacer as aforementioned, there is the case where the thickness of the liquid crystal layer is not formed uniformly and the orientation of liquid crystal molecules is disordered when the distribution of the spacer is nonuniform and the spacer are present on display pixels, giving rise to the problem of a reduction in the display efficiencies including contrast ration.

SUMMARY OF THE INVENTION

The present invention has been made in view of the above problems and has an object of providing a color liquid crystal display which is provided with a shielding member disposed between a sealing member and a display zone to prevent the liquid crystal layer from being contaminated with liquid crystal layer-contaminants from the sealing member wherein the above shielding member is formed of a material excluding substances, which adversely affect the liquid crystal layer, and/or can be produced in a simple production process.

The above object can be attained by the following color liquid crystal display of the present invention. According to the first aspect of the present invention, there is provided a color liquid crystal display comprising at least a color filter substrate provided with a colored layer with plural colors formed into a predetermined pattern in a display zone on a transparent substrate, a counter electrode substrate disposed opposite to and with a predetermined gap from the color filter substrate, a sealing member disposed outside of the display zone to seal the gap formed between both substrates, a liquid crystal layer formed by filling a liquid crystal material in the gap formed between both substrates and sealed by the sealing member and a shielding member disposed between the sealing member and the display zone to prevent the liquid crystal material contained in the liquid crystal layer from being contaminated with contaminants from the sealing member, the shielding member being formed of a material which works such that the voltage retention and residual DC ($\Delta E$) of the liquid crystal material after the impurity-extraction treatment is 80% or more and 0.5 V or less respectively.

The color liquid crystal display of the present invention is provided with the shielding member disposed between the sealing member and the display zone in this manner. Hence the liquid crystal material of the liquid crystal layer never be contaminated with contaminants from the sealing member. Moreover, because the shielding member is formed of such a material as aforementioned, the contamination of the liquid crystal material which is caused by the material of the shielding member is prevented, decreasing the possibilities of white unevenness and seizure of the liquid crystal.

In one form of the color liquid crystal display according to the first aspect of the present invention, preferably the shielding member is formed of a material which does not contain pigments, pigment derivatives, dyes or dye derivatives. This is because these pigments, pigment derivatives, dyes or dye derivatives contaminate the liquid crystal material highly possibly though it depends upon the types of these materials and hence there is the case where the shielding member cannot work such that the voltage retention of the liquid crystal material is 80% or more and the residual DC ($\Delta E$) of the liquid crystal material is 0.5 V or less when the liquid crystal material is subjected to impurity-extraction treatment using a material containing a pigment or pigment derivative or a dye or dye derivative.

According to the second aspect of the present invention, there is provided a color liquid crystal display comprising at least a color filter substrate provided with a colored layer with plural colors formed into a predetermined pattern in a display zone on a transparent substrate, a counter electrode substrate disposed opposite to and with a predetermined gap from the color filter substrate, a sealing member disposed outside of the display zone to seal the gap formed between both substrates, a liquid crystal layer formed by filling a liquid crystal material in the gap formed between both substrates and sealed by the sealing member, a columnar convex portion formed so as to keep the gap between both substrates constant and a shielding member disposed between the sealing member and the display zone to prevent the liquid crystal material of the liquid crystal layer from being contaminated with contaminants from the sealing member and formed of the same material as the columnar convex portion.

Since the material of the shielding member is formed of the same material as the columnar convex portion like this, the shielding member can be produced at the same time when the columnar convex portion is formed. Accordingly, no additional photolithographic step only for producing the shielding member is not required and a color liquid crystal display having a shielding member can be thereby produced in a simple production process. Also, the columnar convex portion which serves to uniform the gap between both substrates can be produced at the same time when the shielding member is produced. It is therefore unnecessary to use glass beads or plastic beads as a spacer. This prevents the production of disorders, namely uneven thickness of the liquid crystal layer and disordered orientation of liquid crystal molecules owing to ununiform dispersion of the spacer and the presence of the spacer on the display pixels, which are produced when such a spacer is used. The display performance such as contrast ration is not decreased resultantly.

In one form of the color liquid crystal display according to the second aspect of the present invention, preferably the shielding member is formed of a material which works such that the voltage retention and residual DC ($\Delta E$) of the liquid crystal material after the impurity-extraction treatment is 80% or more and 0.5 V or less respectively. This makes it possible to produce a color liquid crystal display having both advantages of the color liquid crystal displays according to the first and second aspects of the present invention.

In another form of the color liquid crystal display according to the second aspect of the present invention, preferably the shielding member is formed of the same material as the columnar convex portion and a protective layer. This is because when the shielding member, the columnar convex portion and the protective layer are formed of the same materials in this manner, the three can be formed in one step simultaneously and hence the step of producing the color liquid crystal display can be simplified, which can reduce production costs.

In a further form of the color liquid crystal display according to the second aspect of the present invention, preferably at least a part of the shielding member is formed on a black matrix disposed outside of the display zone.

The formation of a part or all of the shielding member formed on the black matrix disposed outside of the display zone causes the formation of a clearance between the shielding member and the either one of substrates. Specifically, when the shielding member and the columnar convex portion are formed at the same time, the shielding member has the same height as the columnar convex portion. Since the columnar convex portion is formed on the colored layer, the altitude of the columnar convex portion from the substrate surface is higher than that of the shielding member formed on the black matrix by the difference in thickness between the colored layer and the black matrix. Because the gap between the color filter substrate and the counter electrode substrate is defined by the altitude of the columnar convex portion, the clearance is formed between the shielding member and the substrate resultantly.

By forming such a clearance between the shielding member and the substrate, a liquid crystal can be flowed into the clearance between the shielding member and the sealing member when the liquid crystal is filled in the gap between the both substrates. This offers the advantage that the air present between the shielding member and the sealing member is prevented from intruding into the liquid crystal layer. It is to be noted that since the clearance is very small, liquid crystal material-contaminants from the sealing member will not leak from the clearance much enough to produce an adverse effect on the liquid crystal material.

In a still further form of the color liquid crystal display according to the second aspect of the present invention, preferably at least a part of the shielding member is formed on at least one dummy colored layer formed on the black matrix disposed outside of the display zone.

If a part or all of the shielding member is formed on at least one dummy colored layer formed on the black matrix, the shielding member has the same altitude as or slightly higher altitude than that of the columnar convex portion when the shielding member and the columnar convex portion are formed at the same time. It is therefore possible to use the shielding member, like the columnar convex portion, as the spacer which serves to keep a predetermined gap between both substrates. This structure is also useful particularly when it is intended to prevent the sealing member perfectly from being in contact with the liquid crystal material.

In a further version of the color liquid crystal display according to the second aspect of the present invention, preferably the shielding member in the vicinity of a liquid crystal-sealing port and/or a straightening vane of a liquid crystal-sealing port is produced by forming a convex portion formed of the same material as the columnar convex portion on at least one dummy colored layer formed on the black matrix.

When the gap between both substrates at the liquid crystal-sealing port is small, there is the case where the filling rate of the liquid crystal is made slow, giving rise to an efficiency problem. Therefore, a predetermined gap size must be kept between both substrates at the sealing port. The reason why the shielding member in the vicinity of the sealing port and/or the straightening vane of the sealing port is structured by forming a convex portion formed of the same material as the columnar convex portion on at least one dummy colored layer as aforementioned is that the liquid crystal material-sealing port is prevented from being made narrower, which can avoid disorders such as a reduction in the filling rate of the liquid crystal and allows the production of the display in a simpler process.

In a still further version of the color liquid crystal display according to the present invention, preferably the shielding member is formed on a transparent electrode. When the shielding member is formed on a transparent electrode in this manner, the transparent electrode can be led out of the sealing member with ease thereby wiring easily. When the transparent electrode is laid on the shielding member, there is the case where it is necessary to form an insulated layer on the opposite substrate. In this case, a predetermined width is required in light of accuracy. If the shielding member is formed on the transparent electrode, it is unnecessary to form the insulated layer on the opposite substrate and hence a narrow architrave configuration can be attained.

BRIEF DESCRIPTION OF THE DRAWINGS

In the accompanying drawings, there are shown illustrative embodiments of the invention from which these other of its objectives, novel features, and advantages will be readily apparent.

In the drawings:

FIGS. 7A–7D are process diagrams showing another example of a method for producing a color filter substrate used in a color liquid crystal display according to the present invention.

DESCRIPTION OF THE PREFERRED EMBODIMENT

Figure 1:
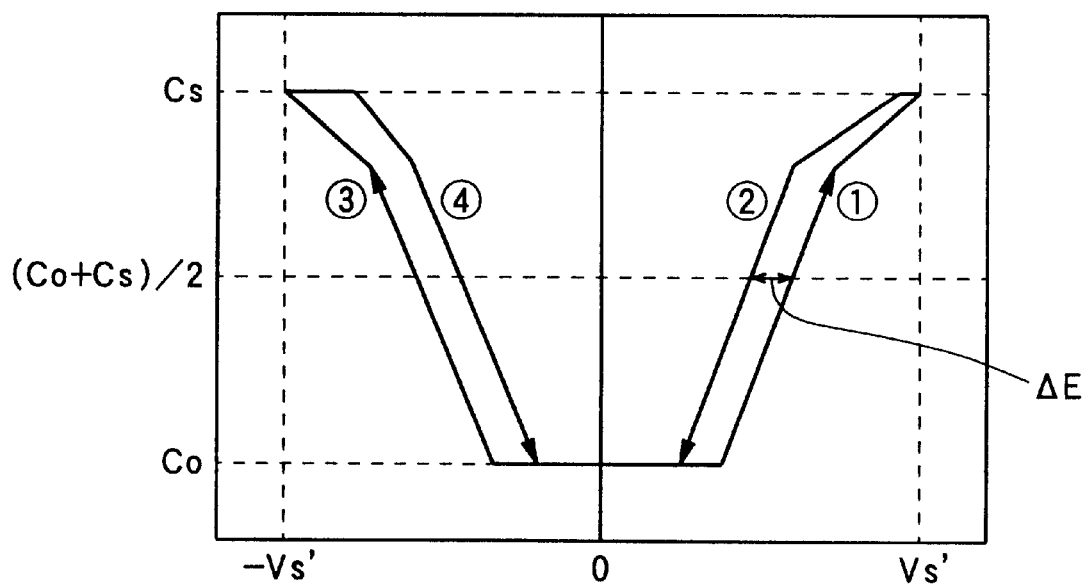
FIG. 1 is graph showing a voltage-capacitance hysteresis loop for explaining the residual DC ($\Delta E$)

The color liquid crystal display according to the present invention will be hereinafter explained in detail. The color liquid crystal display of the present invention is loosely divided into two embodiments. These embodiments will be explained hereinafter as a first embodiment and a second embodiment.

First Embodiment

The first embodiment of the color liquid crystal display according to the present invention comprises at least a color filter substrate provided with a colored layer with plural colors formed into a predetermined pattern in a display zone on a transparent substrate, a counter electrode substrate disposed opposite to and with a predetermined gap from the color filter substrate, a sealing member disposed outside of the display zone to seal the gap formed between both substrates and a liquid crystal layer formed by filling a liquid crystal material in the gap formed between both substrates and sealed by the sealing member, wherein the display further comprising a shielding member disposed between the sealing member and the display zone to prevent the liquid crystal material contained in the liquid crystal layer from being contaminated with contaminants from the sealing member and formed of a material which works such that the voltage retention and residual DC ($\Delta E$) of the liquid crystal material after the impurity-extraction treatment is 80% or more and 0.5 V or less respectively.

A first feature of the first embodiment is in the point that the shielding member is disposed between the sealing member and the display zone to prevent the liquid crystal material contained in the liquid crystal layer from being contaminated with contaminants from the sealing member. This embodiment having such a feature prevents contaminants generated from the sealing member from mingling in the liquid crystal layer to thereby suppress the occurrence of disorders such as display nonuniformity.

Here, concrete examples of the case where the shielding member is disposed such that the liquid crystal material contained in the liquid crystal layer is prevented from being contaminated with contaminants from the sealing member include a case where the shielding member is formed between both substrates, namely the color filter substrate and the counter electrode substrate such that it is stuck to both substrates and the sealing member and the liquid crystal layer are disposed such that they are entirely separated from each other, a case where the shielding member is formed and disposed such that a clearance is produced between the shielding member and either one of both substrates and a case where the shielding member is formed and disposed such that it is stuck to both substrates in parts and in other parts, a clearance is left between the shielding member and either one of both substrates.

It is to be noted that the shielding member may be formed either on the side of the color filter substrate or on the side of the counter electrode substrate. When, for instance, the shielding member is formed such that a clearance is left between the shielding member and the substrate, it may be formed so as to have a clearance either on the side of the color filter substrate or on the side of the counter electrode substrate.

Next, a second feature of this embodiment is in the point that the shielding member is formed of a material which works such that the voltage retention and residual DC ($\Delta E$) of the liquid crystal material after the impurity-extraction treatment is 80% or more and 0.5 V or less respectively. Such a feature ensures that it is possible to prevent the liquid crystal layer from being contaminated from the shielding member itself and also to improve the display qualities of the color liquid crystal display.

Here, the liquid crystal material subjected to impurity-extraction treatment means liquid crystal materials treated by a method in which a shielding member material and a liquid crystal material are brought into contact with each other in a given condition to extract impurities from the shielding member material into the liquid crystal material. A proper material used for the shielding member can be selected by measuring the characteristics of the liquid crystal material after this impurity-extraction treatment. The voltage retention and the residual DC ($\Delta E$) are selected as the characteristics of the liquid crystal material which are measured after the impurity-extraction treatment. The voltage retention is a characteristic corresponding to the white unevenness that is one of display defects. When the voltage applied between electrodes located on both sides of the liquid crystal layer cannot be maintained, the possibility of the generation of the white unevenness will increase. The residual DC ($\Delta E$) is a characteristic corresponding to the seizure which is one of display defects. In order to prevent the seizure, it is necessary to make the residual DC ($\Delta E$) as small as possible to prevent unnecessary voltage from being applied continuously to the liquid crystal layer after the voltage applied to the liquid crystal layer is released.

As the shielding member in this embodiment, it is preferable to use a material, which works such that the voltage retention of the liquid crystal material after the impurity-extraction treatment is 80% or more, preferably 90% or more and particularly preferably 95% or more and the residual DC (ΔE) of the liquid crystal material after the impurity-extraction treatment is 0.5 V or less, preferably 0.2 V or less and particularly preferably 0.1 V or less, in the point that disorders in relation to white unevenness and seizure are caused with difficulty in the color liquid crystal display when the shielding member is provided thereof.

Specific conditions for the impurity-extraction treatment and for measuring voltage retention and residual DC (ΔE) are as follows.

(Conditions for impurity-extraction treatment)

A resin material with a surface area of 4 cm$^2$ is immersed in a liquid crystal with a volume of 0.2 ml to carry out extraction while keeping the temperature at 105° C. for 5 hours. The liquid crystal to be used is one having a voltage retention not less than 95% which is measured in the following voltage retention-measuring condition and a residual DC (ΔE) not more than 0.05 V which is measured in the following residual DC (ΔE)-measuring condition.

(Voltage retention-measuring condition)

A measuring cell is prepared which has the following layer structure: substrate/electrode/orientated layer/liquid crystal/orientated layer/electrode/substrate. A liquid crystal which has been processed by impurity-extraction treatment is injected into the measuring cell to measure in the condition described below.

Distance between electrodes: 5 to 15 μm

Pulse amplitude of applied voltage: 5 V

Pulse frequency of applied voltage: 60 Hz

Pulse width of applied voltage: 16.67 sec (Residual DC (ΔE)-measuring condition)

The residual DC (ΔE) means the magnitude of voltage shift (shown by the arrow in FIG. 1) in the capacitance defined by the formula (C0+Cs)/2 wherein Cs is a maximum capacitance and C0 is a minimum capacitance in the voltage-capacitance hysteresis loop shown in FIG. 1. A measuring cell is prepared which has the following layer structure: substrate/electrode/orientated layer/liquid crystal/orientated layer/electrode/substrate. A liquid crystal which has been processed by impurity-extraction treatment is injected into the measuring cell to measure in the condition described below.

Distance between electrodes: 5 to 15 μm

Liquid crystal to be used: one having a capacitance saturating voltage (Vs' in FIG. 1) of 10 V or less.

Measuring voltage range of voltage-capacitance hysteresis loop: −10 V to +10 V

In this embodiment, any material may be used as the material of the shielding member as far as it satisfies the above requirements. Given as specific examples of the material of the shielding member are those produced by laminating plural colored layers and combinations of colored layers and other layers (e.g., a protective layer and a black matrix made of a resin). In this s embodiment, preferably the shielding member is f formed of a material excluding pigments, pigment derivatives, dyes and dye derivatives because it is highly possible that these pigments and dyes adversely affect the characteristics of the liquid crystal material after the impurity-extraction treatment. Specifically, a shielding member formed of a transparent material is preferably used.

In this embodiment, the entire of the shielding member is not necessarily formed of a material satisfying the above requirements. If at least a part of the shielding member which is in contact with the liquid crystal material of the liquid crystal layer is formed of a material satisfying the above requirements, this suffices the condition. For instance, in the case where the surface of the shielding member is coated with a surface layer such as a protective layer, if the surface layer is formed of a material satisfying the above requirements, this suffices the condition. It is to be noted that the shielding member so-called in the present invention, when it is formed of plural materials such that the above surface layer is formed, is allowed, depending upon the situation, to have a concept involving the entire structure including these materials depending upon the situation.

Figure 2:
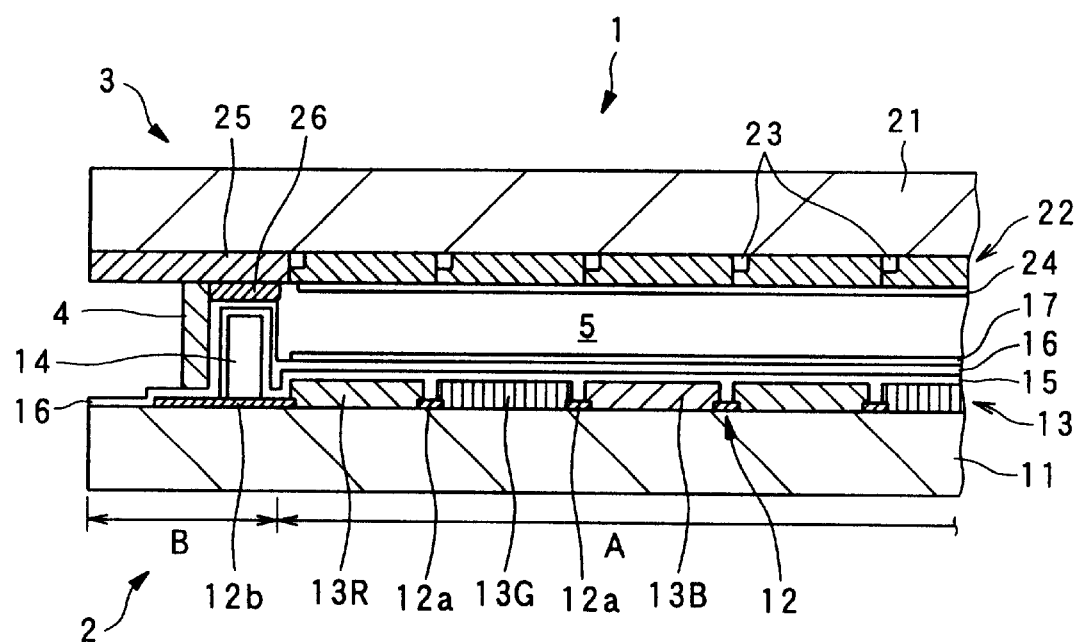
FIG. 2 is a partly sectional view in the vicinity of an end portion showing one example of a color liquid crystal display according to the present invention.

The first embodiment of the present invention will be hereinafter explained in more detail with reference to FIG. 2 which is a partly sectional view of an example of the first embodiment. In FIG. 2, a color liquid crystal display 1 of this embodiment has a structure in which a color filter substrate 2 is made to oppose a counter electrode substrate 3 with a predetermined gap, the peripheral portion of the both substance is sealed by a sealing member 4 and a shielding member 14 which is arranged inside of the sealing member 4 and a liquid crystal layer 5 is formed in the gap portion between both substrates. On each outside of the color filter substrate 2 and the counter electrode substrate 3, a polarizing plate (not shown) is disposed. A spacer (not shown) such as glass beads or plastic beads is present between both substrates. In this case, the spacer is not limited to the aforementioned beads-like materials but may be constituted of, for instance, a columnar convex portion formed on either one of both substrate sides.

In the color filter substrate 2 constituting the color liquid crystal display 1, a black matrix 12 and a colored layer 13 are formed into a desired pattern on a transparent substrate 11. A liquid crystal-driving transparent electrode 16 and an oriented layer 17 are formed on the black matrix 12 and the colored layer 13 through a transparent protective layer 15. The above black matrix 12 is divided into a matrix 12a formed into a desired pattern in a display zone A and a black matrix 12b formed in a zone B around the zone A. In the zone A, the colored layer 3 is formed. The colored layer 13 comprises a red pattern 13R, a green pattern 13G and a blue pattern 13B which are arranged in a desired form, e.g., a mosaic type, stripe type, triangle type or four pixels-arrangement type. The black matrix 12a is located between colored patterns.

The shielding member 14 is formed on the black matrix 12b in t he zone B outside of the display zone A so as to enclose the display zone A. Moreover, in this example, the transparent protective layer 15 and the transparent electrode 16 are laminated on the shielding member 14 and the transparent electrode 16 is led out externally from the lower portion of the sealing member 4. Although, in this example, the transparent protective layer 15 and the transparent electrode 16 are laminated on the shielding member 14, this embodiment is not limited to this with regard to the structure of this part. For instance, various structures, e.g., a structure in which the transparent protective layer 15 is not formed, a structure in which the transparent electrode 16 is not formed especially at the position of the shielding member 14 and a structure in which the shielding member 14 is formed on the transparent electrode 16. Among these structures, a structure in which the shielding member 14 is formed on the transparent electrode 16 and a structure in which the transparent electrode 16 is not formed especially at the position of the shielding member 14 are desirable, for example, in the point that no insulated layer 26 explained later may be formed.

In the example shown in FIG. 2, the height of the shielding member 14 defines the gap between the color filter substrate 2 and the counter electrode substrate 3 and also defines the thickness of the liquid crystal layer 5 in combination of the aforementioned spacer. Concretely, in this embodiment, the height of the shielding member 14 may be properly determined in a range between 2.0 and 10.0 μm. As mentioned above, the shielding member 14 may be formed such that a clearance is formed between the shielding member 14 and the counter electrode substrate 3. In this case, the height of the shielding member 14 does not serves to define the gap between the color filter substrate 2 and the counter electrode substrate 3.

The transparent protective layer 15 makes the surface of the colored layer 13 flat and is formed where it is necessary. The thickness of the transparent protective layer 15 may be determined in consideration of, for instance, the light transmittance of the material to be used and the surface condition of the colored layer 13 and may be designed to be in a range between 0.1 and 1.5 μm.

On the other hand, the counter electrode substrate 3 which is another substrate constituting the color liquid crystal display 1 is provided with a liquid crystal-driving transparent electrode 22, a thin film transistor (TFT) 23 and an oriented layer 24 formed so as to coat the transparent electrode 22 on the transparent substrate 21. On the counter electrode substrate 3, a gate wire group (not shown) for turning on or off the thin film transistor (TFT) 23, a signal wire group (not shown) for supplying image signals and a wire for supplying the voltage, delivered from the side of the color filter substrate 2, to the color filter electrode are wired. Lead wires 25 of them are made of a metal such as Al which is formed at the same time in the step of producing the thin film transistor (TFT) 23 and are connected to the transparent electrode 22 and also to an electric connecting wiring from an external driving IC (not shown).

When, as is shown in this example, the transparent electrode 16 is formed on the shielding member 14 and drawn out externally, it is desirable to form an insulated layer 26 in the corresponding position of the side of the counter electrode substrate 3 except for contact points required for conduction.

As the sealing member 4 constituting the color liquid crystal display 1, any seal material which is conventionally used in liquid crystal displays can be used for the sealing member 4 and there is no particular limitation to the material of the sealing member. For instance, any one of bisphenol F type glycidyl ether resins, bisphenol A type glycidyl ether resins, resorcinol glycidyl ether resins, phenol novolac epoxy resins and triphenolmethane type resins may be used. Such a sealing member is used to seal the gap between both substrates outside of the shielding member 14 and curing treatment is performed by heating or the like whereby the sealing member 4 can be formed.

For these transparent substrates 11 and 21 constituting the aforementioned color filter substrate 2 and the counter electrode substrate 3 respectively, any one of non-flexible rigid materials such as quartz glass, Pyrex glass and synthetic quartz and flexible materials such as transparent resin films and optical resin plates may be used. Among these materials, especially a 7059 glass manufactured by Corning is a material which has a small thermal expansion coefficient and is superior in dimensional stability and workability in high temperature heat treatment and a non-alkali glass which includes no alkali component therein. This glass is therefore suitable for use in color liquid crystal displays according to an active matrix system. Also, "AN635" manufactured by Asahi Glass Co., Ltd. and "OA2" manufactured by Nippon Electric Glass Co., Ltd. are preferably used because of small BaO content and excellent chemical resistance.

The transparent electrodes 16 and 22 which constitute the color liquid crystal display 1 are formed by a usual filming method, e.g., a sputtering method, vacuum deposition method or CVD method using indium tin oxide (ITO), zinc oxide (ZnO), tin oxide (SnO) or the like or alloy of these metal oxides. Each thickness of these transparent electrodes 16 and 22 is about 0.01 to 1 μm and preferably about 0.03 to 0.5 μm.

The oriented layers 17, 24 constituting the color liquid crystal display 1 are those containing at least one of polyimide type, polyamide type, polyurethane type and polyurea type organic compounds. Each thickness of these layers may be about 0.01 to 1 μm and preferably about 0.03 to 0.5 μm. For the production of these oriented layers 17 and 24, orientation treatment (rubbing) is carried out after these layers are applied using a well-known application method such as various printing methods and baked.

Figure 3:
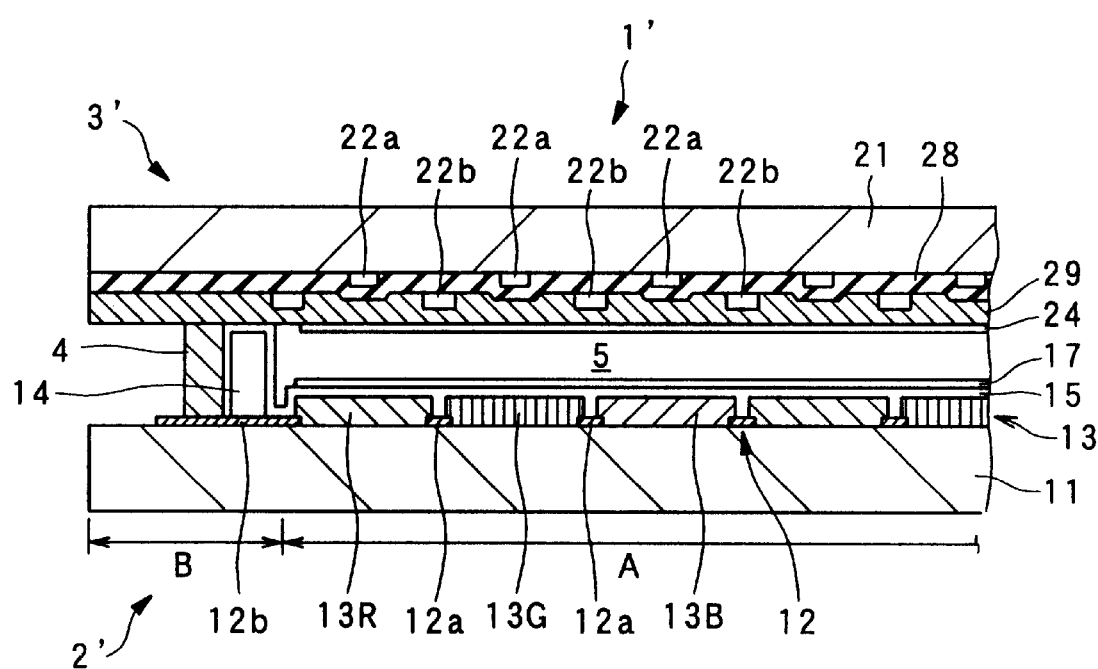
FIG. 3 is a partly sectional view in the vicinity of an end portion showing another example of a color liquid crystal display according to the present invention.

Next, another example of this embodiment will be explained with reference to FIG. 3. FIG. 3 is a partly sectional view showing an example in which the aforementioned first embodiment is applied to an In-plane-Switching (IPS) color liquid crystal display.

In FIG. 3, a color liquid crystal display 1' of the embodiment has a structure in which a color filter substrate 2' is opposed to a counter electrode substrate 3' with a predetermined gap, the peripheral portion of these substrates is sealed by a sealing member 4 and a shielding member 14 disposed inside of the sealing member 4 and a liquid crystal layer 5 is formed in the gap between both substrates. On each outside of color filter substrate 2' and the counter electrode substrate 3', a polarizing plate (not shown) is disposed. A spacer (not shown) such as glass beads or plastic beads is present between both substrates. In this embodiment, the spacer is not limited to these beads or the like but may be formed of, for instance, a columnar convex portion, which is allowed to have a function as a spacer like the above.

In the color filter substrate 2' constituting the color liquid filter display 1', a black matrix 12 and a colored layer 13 are formed into a predetermined pattern on a transparent substrate 11. An oriented layer 17 is formed on the black matrix 12 and the colored layer 13 through a transparent protective layer 15. The aforementioned black matrix 12, colored layer 13 and transparent protective layer 15 are the same as those in the above example shown in FIG. 2. A shielding member 14 which is the notable feature of this embodiment is the same as that in the above example shown in FIG. 2 and is formed of a material which works such that the voltage retention and residual DC (ΔE) of the liquid crystal material after the impurity-extraction treatment is 80% or more and 0.5 V or less respectively.

On the other hand, the counter electrode substrate 3' is provided with a common electrode 22a and a pixel portion electrode 22b formed via an insulated layer 28 on a transparent substrate 21, a transparent protective layer 29 is formed on these electrodes and an oriented layer 24 is formed on the transparent protective layer 29. To tell further, in FIG. 3, a thin film transistor (TFT) and each wiring are omitted.

In the IPS system, it is unnecessary to form an insulated layer for preventing a short at a portion which is in contact with the top of the shielding member 14 of the counter electrode substrate 3' since a transparent electrode is not formed on the side of the color filter substrate 2'. Even in an embodiment in which not only the shielding member but also a columnar convex portion is formed in a display zone A of the color filter substrate 2', it is likewise unnecessary to form an insulated layer for preventing a short on the counter electrode substrate 3'.

In the IPS system, although its detailed explanations are omitted, when voltage is applied between the common electrode 22a and the pixel electrode 22b which are formed on the counter electrode substrate 3' to form an electric field in the direction parallel to the interface of the color filter substrate 2' or of the counter electrode substrate 3', liquid molecules of the liquid crystal layer 5 is deflected and hence revolves on a plane parallel to the substrate 2' and 3', which rotates the deflecting axis of the light emitted from a light source (not shown) to turn on the pixel.

In the color liquid crystal display 1' as aforementioned, the gap between the color filter substrate 2' and the counter electrode substrate 3' is sealed by the sealing member 4 and the shielding member 14 positioned inside of the sealing member 4. Hence, the liquid crystal layer 5 formed by filling a liquid crystal in a sealed space is prevented from being in contact with the sealing member 4 by the shielding member 14. Even if any reaction gas is generated or any solvent or the like is eluted from the sealing member 4 in a step of curing the sealing member 4 before the liquid crystal material is injected, the liquid crystal layer 5 is not contaminated with these substances, making it possible to obtain stable display quality without any display nonuniformity.

No particular limitation is imposed on a method for the production of the color liquid crystal display according to this embodiment. The color liquid crystal display of this embodiment may be produced using a customarily available method of the production of a color liquid crystal display. To state in detail, for instance, as for the production of the color filter substrate, the method of producing a color filter substrate which will be explained in a second embodiment may be used. The shielding member which is the notable feature of this embodiment may be formed by a separate photolithographic process. Also, it may be formed at the same time, when the columnar convex portion is formed, depending upon material, for example, in the case of using the same material as the columnar convex portion which functions as a spacer. A shielding member formed by laminating colored layers may be used if it fulfills the aforementioned requirements for the shielding member material.

Second Embodiment

A second embodiment of the color liquid crystal display according to the present invention comprises at least a color filter substrate provided with a colored layer with plural colors formed into a predetermined pattern in a display zone on a transparent substrate, a counter electrode substrate disposed opposite to and with a predetermined gap from the color filter substrate, a sealing member disposed outside of the display zone to seal the gap formed between both substrates and a liquid crystal layer formed by filling a liquid crystal material in the gap formed between both substrates and sealed by the sealing member, wherein the color liquid crystal display further comprising a columnar convex portion formed so as to keep the gap between both substrates constant and a shielding member disposed between the sealing member and the display zone to prevent the liquid crystal material of the liquid crystal layer from being contaminated with contaminants from the sealing member and formed of the same material as the columnar convex portion.

A first feature of the second embodiment is in the point that the shielding member is provided between the sealing member and the display zone to prevent the liquid crystal material of the liquid crystal layer from being contaminated with contaminants from the sealing member. This point is the same as in the aforementioned first embodiment and so its explanations are omitted here.

Next, a second feature of the second embodiment is in the point that this embodiment comprises the columnar convex portion formed so as to keep the gap between the color filter substrate and the counter electrode substrate constant and the shielding member formed of the same material as the columnar convex portion. Since this embodiment is provided with the shielding member formed of the same material as the columnar convex portion used as a spacer which keeps the gap between both substrates constant, the shielding member can be produced at the same time when the columnar convex portion is formed. Accordingly, no additional photolithographic step only for producing the shielding member is not required and a color liquid crystal display having a shielding member can be thereby produced in a simple production process. Also, because the gap between both substrates is kept using the columnar convex portion as a spacer, problems remaining unsolved when a beads-like spacer is used are not posed in this embodiment. Specifically, when such a beads-like spacer is used, there is the case where the thickness of the liquid crystal layer is uneven and the orientation of liquid crystal molecules is disordered when there is ununiform dispersion of the spacer and the spacer is present on the display pixels. This reduces the display performance such as contrast ration.

No particular limitation is imposed on materials for forming such a columnar convex portion and shielding member insofar as it is usually used and various materials may be used. Concretely, UV-curable resins, thermosetting resins and the like may be used. These resins will be hereinafter explained in detail.

(1) UV-curable Resins

Firstly, UV-curable resins will be explained. As the UV-curable resin used in this embodiment, those comprising a monomer or an oligomer which has at least one or more functional groups and increases in the molecular weight and forms a cross-linking structure by ion polymerization or radical polymerization which runs by ions or radicals produced by applying curing energy beams to a photopolymerization initiator. The functional group so-called here is an atomic group or bonding form, such as a vinyl group, carboxyl group or hydroxyl group, which is a cause of a reaction.

Given as examples of such a monomer or oligomer are acrylic types such as epoxyacrylate, urethane acrylate, polyester acrylate, polyether acrylate and silicon acrylate and non-acrylic types such as unsaturated polyester/styrene types and polyene/styrene types. Among these compounds, acrylic types are preferred in view of curing speed and wide selectivity of various properties. Typical examples of such an acrylic type are shown below.

Examples of acrylic types having a monofunctional group may include 2-ethylhexylacrylate, 2-ethylhexyl EO adduct acrylate, ethoxydiethylene glycol acrylate, 2-hydroxyethylacrylate, 2-hydroxypropylacrylate, caprolactone adducts of 2-hydroxyethylacrylate, 2-phenoxyethylacrylate, phenoxydiethylene glycol acrylate, nonylphenol EO adduct acrylate, caprolactone addition nonylphenol EO adduct acrylate, 2-hydroxy-3-phenoxypropylacrylate, tetrahydrofurfurylacrylate, caprolactone adduct acrylate of furfuryl alcohol, acryloylmorpholine, dicyclopentenylacrylate, dicyclopentanylacrylate, dicyclopentenyloxyethylacrylate, isobornylacrylate, caprolactone adduct acrylate of 4,4-dimethyl-1,3-dioxolane and caprolactone adduct acrylate of 3-methyl-5,5-dimethyl-1,3-dioxolane.

Examples of acrylic types having a polyfunctional group may include hexanediol diacrylate, neopentyl glycol diacrylate, polyethylene glycol diacrylate, tripropylene glycol diacrylate, diacrylate of neopentyl glycol hydroxypivalate, caprolactone adduct diacrylate of neopentyl glycol hydroxypivalate, acrylic acid adduct diglycidyl ether of 1,6-hexanediol, diacrylate of an acetal compound of hydroxypivalaldehyde and trimethylolpropane, 2,2-bis[4-(acryloyloxydiethoxy)phenyl]methane, hydrogenated bisphenolethylene oxide adduct diacrylate, tricyclodecanedimethanol diacrylate, trimethylolpropane triacrylate, pentaerythritol triacrylate, trimethylolpropanepropylene oxide adduct triacrylate, glycerol propylene oxide adduct triacrylate, dipentaerythritol hexaacrylate pentaacrylate mixtures, caprolactone adduct acrylate of dipentaerythritol, tris(acryloyloxyethyl) isocyanurate and 2-acryloyloxyethyl phosphate.

There is no particular limitation to the photopolymerization initiator contained in the UV-curable resin used in the present invention and any one selected from known photopolymerization initiators may be used. Specific examples of the photopolymerization initiator include acetophenone types, benzophenone types, Michler's ketone types, benzyl types, benzoin types, benzoin ether types, benzyldimethylketal types, benzoin benzoate types, carbonyl compounds of α-acyloximester types or the like, sulfur compounds of tetramethylthiuram monosulfide, thioxanthones or the like and phosphorus compounds such as 2,4,6-trimethylbenzoyldiphenyl phosphinoxide or the like.

(2) Thermosetting resins

Next, the thermosetting resins will be explained. As the thermosetting resin composition used in the present invention, those cured by addition of heat energy and the strength after being cured is enough to give a function as a spacer may be exemplified. Typical examples of the thermosetting resin include a polycarbonate, polymethylmethacrylate, polymers or copolymers of methylphthalate, polyethylene terephthalate, polystyrene, diethylene glycol bisallyl carbonate, acrylonitrile/styrene copolymers and poly(-4-methylpenetene-1).

In this embodiment, the columnar convex portion and the shielding member are preferably formed of transparent materials. However, the materials used for these portion and member are not limited to transparent materials and those colored by mixing pigments or the like are acceptable.

The shielding member and the columnar convex portion used in this embodiment may be formed either on the side of the color filter substrate or on the side of the counter electrode substrate. However, the shielding member and the columnar convex portion are preferably formed on the same substrate since it is effective to form the both at the same time.

In this embodiment, among these materials for the shielding member, it is preferable to use materials which work such that the voltage retention and residual DC (ΔE) of the liquid crystal material after the impurity-extraction treatment is 80% or more and 0.5 V or less respectively. The use of such a material prevents the liquid crystal material contained in the liquid crystal layer from being contaminated with the shielding member and the columnar convex portion and hence suppress disorders of liquid crystal display. This point is the same as in the aforementioned first embodiment and hence further explanations are omitted.

In this embodiment, further the material used for the shielding member is preferably the same as that of the protective layer. This is because when the shielding member, the columnar convex portion and the protective layer are formed of the same materials in this manner, these three parts can be formed on the substrate simultaneously and hence the step of producing the color liquid crystal display can be simplified, which can reduce production costs.

Figure 4:
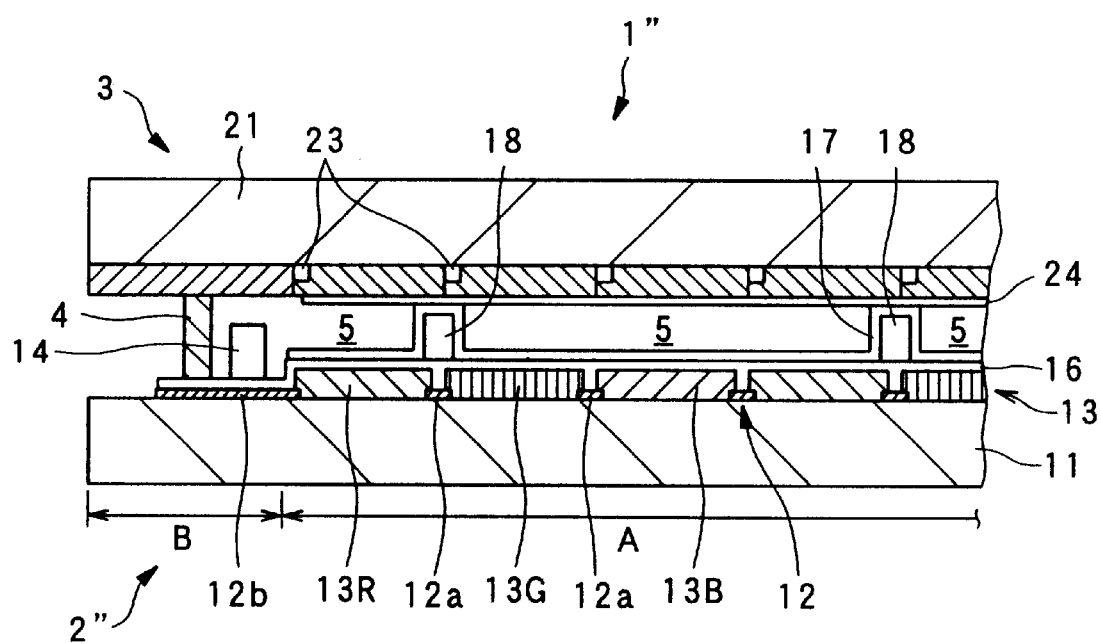
FIG. 4 is a partly sectional view in the vicinity of an end portion showing a further example of a color liquid crystal display according to the present invention.

The second embodiment of the present invention will be hereinafter explained in more detail with reference to FIG. 4 which is a partly sectional view of an example of this embodiment. In FIG. 4, a color liquid crystal display 1' of this embodiment has a structure in which a color filter substrate 2' is opposed to a counter electrode substrate 3 with a predetermined gap and the peripheral portion of the substrate is sealed by a sealing member 4. A shielding member 14 is formed inside of the sealing member 4. The counter electrode substrate 3 and sealing member 4 of this color liquid crystal display 1' are the same as those in the aforementioned example shown in FIG. 2 and hence further explanations are omitted. A colored layer 13 (13R, 13G and 13B) on the color filter substrate 2' and a black matrix 12 (12a and 12b) are the same as those in the aforementioned example shown in FIG. 2, and hence further explanations are also omitted.

The columnar convex portion 18 to be formed on the color filter substrate 2' in the example shown in FIG. 4 is provided at predetermined plural positions in the display zone A and has a height corresponding to the gap between the color filter substrate 2' and the counter electrode substrate 3. In the example shown in FIG. 4, a transparent electrode 16 is formed on the black matrix 12b formed on the display zone A and the peripheral zone Be On the transparent electrode 16, the shielding member 14 and the columnar convex portion 18 are formed at the same time. In the example shown in FIG. 4, an oriented layer 17 is further formed on the shielding member 14 and the columnar convex portion 18.

The above columnar convex portion 18 is disposed on the colored layer 13, which is formed on the black matrix 12a such that it overlaps on the black matrix 12a, and projects more externally than the colored layer 13 by a length ranging from about 2 to 10 μm. The length projected may be properly designed on the basis of the thickness required for the liquid crystal layer 5 of the color liquid crystal display 1'. The formation density of the columnar convex portion 18 may be properly designed taking unevenness of the thickness, opening ratio and the like of the liquid crystal layer 5 into consideration. For instance, the columnar convex portion 18 is formed so as to perform a function necessary and sufficient as a spacer in a ratio of one to one pair of red pattern 13R, green pattern 13G and blue pattern 13B which are consist of the colored layer 13. No particular limitation is imposed on the shape of the columnar convex portion and it may take each of various forms, e.g., a cylindrical form or prismatic form.

In the example shown in FIG. 4, the shielding member 14 is formed on the black matrix 12b formed outside of the display zone A whereas the columnar convex portion 18 is formed on the colored layer 13. The shielding member 14 and the columnar convex portion 18 are formed simultaneously by, for example, a lithographic process and hence with the same heights. Each total height of the shielding member 14 and the columnar convex portion 18, namely each altitude of the both from the surface of the transparent substrate 11 of the color filter substrate 2' is set such that the columnar convex portion 18 is higher than the shielding member 14 by the difference in thickness between the colored layer 13 and the black matrix 12b. The columnar convex portion has a function as a spacer keeping both substrates at a constant interval and hence a fixed clearance is formed between the shielding member 14 and the counter electrode substrate 3. When such a clearance is formed between the shielding member 14 and the counter electrode substrate 3 in this manner, a part of the liquid crystal material is flowed into between the shielding member 14 and the sealing member 4 from the clearance when the liquid crystal material is injected. If the liquid crystal material is made to flow into between the shielding member 14 and the sealing member 4, this alleviates the suffering from the disadvantage that air bubbles present between the shielding member 14 and the sealing member 4 intermingle with the liquid crystal layer 5 in the subsequent use or the like. In, for instance, the case where the entrainment of air bubbles in the liquid crystal layer 5 is a problem, it is preferably to use those having a structure provided with the shielding member 14 formed on the black matrix 12b and having a clearance between the shielding member 14 and the counter electrode substrate 3 like the example shown in FIG. 4.

It is to be noted that since the clearance between the shielding member 14 and the counter electrode substrate 3 can be made extremely small, the contaminants which are generated from the sealing material 4 and flow into the liquid crystal layer 5 are limited in amount, giving rise to no problem.

Figure 5:
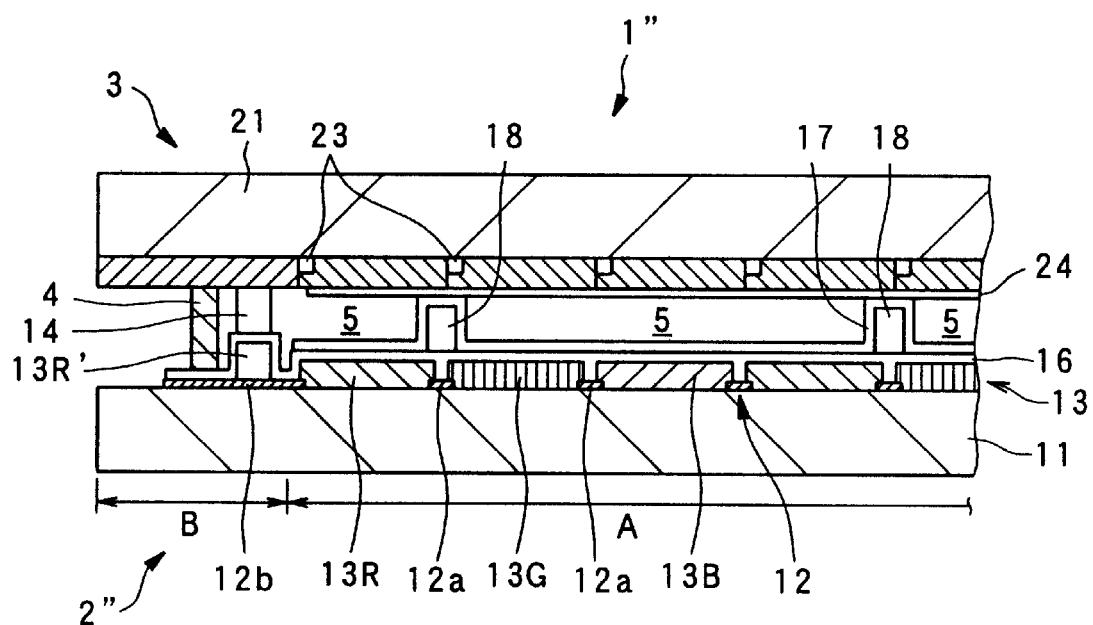
FIG. 5 is a partly sectional view in the vicinity of an end portion showing a still further example of a color liquid crystal display according to the present invention.

FIG. 5 is a partly sectional view showing another example of this embodiment. The example shown in FIG. 5 differs from the example shown in FIG. 4 in the point that a shielding member 14 is formed on a dummy colored layer 13R' in the example shown in FIG. 5. This dummy colored layer 13R' has been formed in advance at the position, where the shielding member 14 on a black matrix 12b formed outside of the display zone is to be formed, when forming a colored layer 13R. On the dummy colored layer 13R', a transparent electrode 16 is formed.

In the example shown in FIG. 5, the shielding member 14 is further formed on the dummy colored layer 13R'. The shielding member 14 in this example is therefore formed on the dummy colored layer 13R' formed on the black matrix 12b. Here, since the shielding member 14 and the columnar convex portion 18 are formed of the same materials simultaneously like in the example shown in FIG. 4, the heights of the both are almost the same. Each altitude of the shielding member 14 and the columnar convex portion 18 from the surface of the transparent substrate 11 on the side of the color filter substrate 2' is set such that the both are almost the same or the shielding member 14 is slightly higher than the columnar convex portion 18. There is therefore no clearance unlike in the example shown in FIG. 4 between the counter electrode substrate 3 and the shielding member 14 so that the liquid crystal layer 5 is in the condition that it is sealed by the shielding member 14.

It is effective to use this example, for instance, in the case of intending to form a predetermined gap between both substrates at the area out of the display zone and to prevent the liquid crystal material, contained in the liquid crystal layer 5, perfectly from being in contact with the sealing member 4.

In the aforementioned example shown in FIG. 5, an example in which the shielding member 14 is formed on the dummy colored layer 13R' is shown. This embodiment is not limited to this example and there is no particular limitation is imposed on the arrangement of the shielding member 14 insofar as it is formed after at least one dummy colored layer is laminated, for instance, after two dummy colored layers are laminated, the shielding member 14 and the columnar convex portion 18 are formed at the same time on the these colored layers.

In the example shown in FIG. 5, the dummy colored layer 13R' is covered with the transparent electrode 16. When the dummy colored layer 13R' is not covered with the transparent electrode 16 or the like unlike the above, preferably the dummy colored layer 13R' is formed such that the surface of the dummy colored layer 13R' on the side of the liquid crystal layer 5 is covered with the shielding member 14. This is because the dummy colored layer generally contains pigments or pigment derivatives which adversely affect the display performance of the liquid crystal material highly possibly and if these pigments or pigment derivatives are brought into contact with the liquid crystal material sealed in the liquid crystal layer, there are high possibilities of the display performance of the liquid crystal material being adversely affected by these materials.

Whether or not the shielding material is formed on the dummy colored layer and how many dummy colored layers are laminated are properly determined according to the necessity of a gap between the shielding member and the substrate, the propriety of contact between the sealing member and the liquid crystal material and a clearance required between the substrates in the periphery of the display zone. In this embodiment, the shielding member may be all formed on the dummy colored layer and also on the black matrix. Moreover, the shielding member may be formed such that its height is changed in parts, for instance, a part of the shielding member is formed on the dummy colored layer and other parts are formed on the black matrix.

In an example given as a preferable embodiment for forming the shielding member partly on the dummy colored layer, a shielding member in the vicinity of a liquid crystal-sealing port (a shielding member within a range of 10 to 20 mm from the end of the shielding member) for filling the liquid crystal material in the liquid crystal layer and/or a straightening vane formed in the sealing port for the liquid crystal material is formed on at least one dummy colored layer. In the vicinity of the liquid crystal material-sealing port, the liquid crystal material can be inefficiently filled if no certain clearance is formed between both substrates when the liquid crystal material is filled. This is the reason why the above structure is preferred. The reminder of the shielding material in this case may be formed all on the black matrix or partly on the dummy colored layer.

In this embodiment, as shown in FIG. 4 and FIG. 5, preferably the shielding member 14 and the columnar convex portion 18 are formed on the transparent electrode 16. When the shielding member 14 and the columnar convex portion 18 are formed on the transparent electrode 16 like this, it is unnecessary to form an insulated layer on the side of the counter electrode substrate 3, which increases the freedom of designing of wiring on the side of the counter electrode substrate and the freedom of designing of a transparent electrode pattern on the color filter substrate and hence a narrow architrave configuration can be attained. It is to be noted that, in this case, there is n o particular limitation to the position of the transparent electrode as far as it is not formed on the shielding member. For instance, when the dummy colored layer is formed, a structure is allowed in which the transparent electrode is formed on the dummy colored layer and the shielding member is formed on the transparent electrode.

On the other h and, when the transparent electrode is formed on the shielding member and the columnar convex portion, it is necessary to form an insulated layer at a position where the shielding member and the columnar convex portion on the side of the counter electrode substrate are in contact with each other to prevent a short with the transparent electrode on the side of the counter electrode substrate.

Next, a method for the production of the color filter substrate used in the color liquid crystal display of this embodiment will be explained with reference to FIG. 6.

Figure 6A:
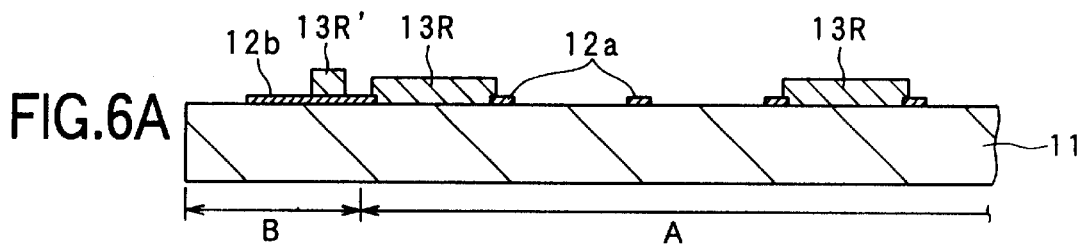
FIGS. 6A–6E are process diagrams showing an example of a method for producing a color filter substrate used in a color liquid crystal display according to the present invention.
Figure 6B:
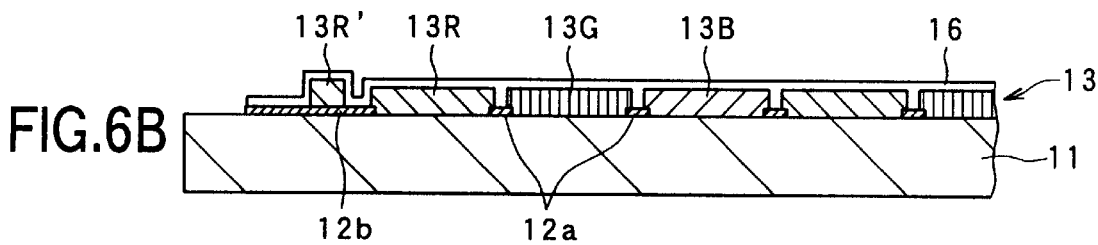

Firstly, on a transparent substrate 11 on which a black matrix 12 with a predetermined pattern is formed, a red pattern 13R is formed in a red pattern-forming zone between the black matrixes 12a in a display zone A and at the same time, a dummy colored layer 13R' is formed on the black matrix 12b in a zone B (see FIG. 6(A)).

The above black matrix 12 may be formed, for example, as follows. First, a shading layer consisting of, for example, a metal thin film made of, for example, chromium which is formed by a sputtering method, vacuum deposition method or the like and a resin layer containing shading particles such as carbon fine particles is formed on the substrate 11. A photosensitive resist layer is formed on the shading layer by using a positive type or a negative type photoresist. Next, the photosensitive resist layer is exposed through a photomask for black matrix and developed. The exposed shading layer is etched and thereafter the photoresist layer left unremoved is removed to thereby form the black matrix 12.

The above red pattern 13R and the dummy colored layer 13R' are formed, for example, by the following method. Firstly, a red-photosensitive resin layer containing a red colorant is formed on the substrate 11 so as to cover the black matrix 12. The red-photosensitive resin layer is exposed through a given photomask and developed to form the red pattern 13R in the red-pattern forming zone on the substrate 11 and at the same time, the dummy colored layer 13R' on the black matrix 12b.

Next, a green pattern 13G is formed on a green-pattern forming zone on the substrate 11 and further a blue pattern 13B is formed on a blue-pattern forming zone on the substrate 11. After that, a transparent electrode 16 is formed so as to cover the colored layer 13, the dummy colored layer 13R' and the black matrix 12b (see FIG. 6(B)). The transparent electrode 16 may be formed using indium tin oxide (ITO), zinc oxide (ZnO), tin oxide (SnO) or the like or alloys of these compounds by a usual filming method such as a sputtering method, vacuum deposition method or CVD method.

Figure 6C:
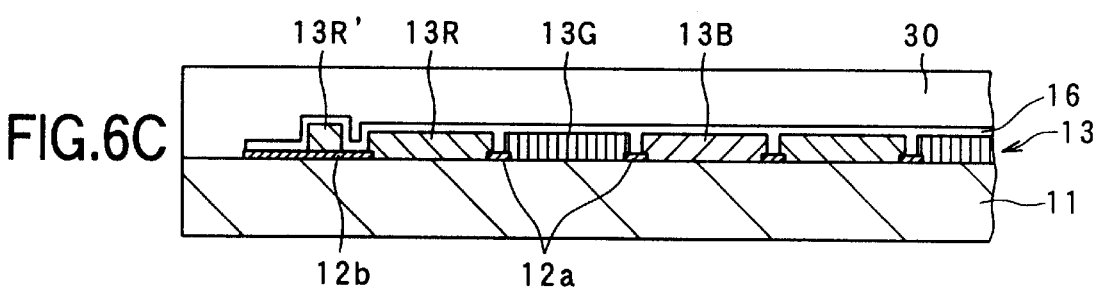

Then, a negative type transparent photosensitive resin layer 30 is formed on the substrate 11 so as to cover the substrate 11 (FIG. 6(C)). The transparent photosensitive resin layer 30 may be formed by applying a well-known negative type transparent photosensitive resin composition, whose viscosity has been optimized, by a well-known means such as a spin coater or roll coater, followed by drying. The thickness of the transparent photosensitive resin 30 may be properly set according to each height required for the shielding member 14 and columnar convex portion 18.

Figure 6D:
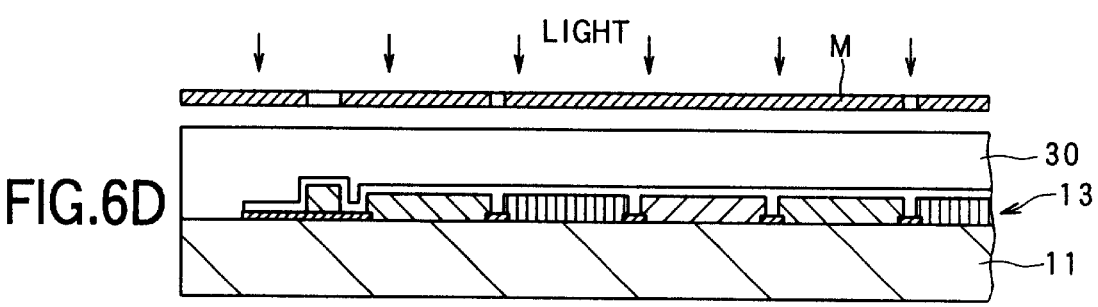
Figure 6E:
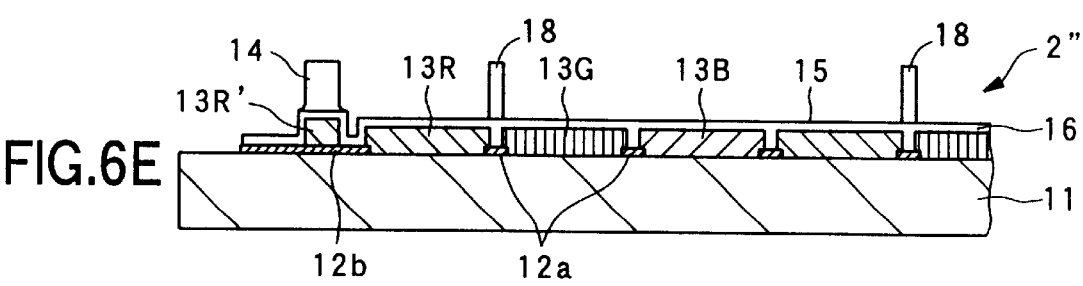

Next, the negative type transparent photosensitive resin layer 30 is exposed through a photomask M (see FIG. 6(D)). In order for a transparent protective layer to be unformed in the periphery of the substrate 11, a mask may be provided to prevent the periphery of the substrate 11 from being exposed to perform the above-mentioned curing treatment. Then, the transparent photosensitive resin layer 30 is developed using a developing solution. By this development, the transparent photosensitive resin layer 30 on the portions where the shielding member 14 and the columnar convex portion 18 are formed is left undissolved and the transparent photosensitive resin layer 30 on other regions is dissolved and removed (see FIG. 6(E)). Thus the shielding member 14 and the columnar convex portion 18 are formed at the same time. Thereafter, the oriented layer is formed, followed by carrying out predetermined curing treatment to obtain the color filter substrate 2".

Although a negative type transparent photosensitive resin composition is used in the aforementioned production method, a well-known positive type transparent photosensitive resin composition may be used to form the color filter substrate. In this case, as mentioned above, after the black matrix 12, the colored layer 13 and the dummy colored layer 13R' and then the transparent electrode 16 are formed, a positive type transparent photosensitive resin layer is formed so as to cover these layers. Then, the positive type transparent photosensitive resin layer is exposed using a photomask for forming the shielding member 14 and the columnar convex portion 18 and developed. By this development, the positive type transparent photosensitive resin layer on the portions where the shielding member 14 and the columnar convex portion 18 are to be formed is left undissolved and other regions are dissolved and removed, to thereby form the shielding member 14 and the columnar convex portion 18 at the same time.

In addition, the shielding member 14 and the columnar portion 18 may be formed by forming a transparent resin layer corresponding to each height required for the shielding member 14 and columnar convex portion 18 and forming a resist layer at the positions where the shielding member 14 and the columnar convex portion 18 on the transparent resin layer are to be formed, followed by etching.

When the shielding member and the columnar convex portion are formed of the same materials in this manner, the both can be formed at the same time by the method mentioned above. Therefore, a color filter substrate provided with the shielding member and the columnar convex portion can be produced without carrying out a new additional step. This decreases the production cost and hence the resulting color liquid crystal display can be provided at a low price.

Next, another method of producing the color filter substrate used in the color liquid crystal display of this embodiment will be explained with reference to FIG. 7. This example shows one in which the shielding member, the columnar convex portion and the protective layer are formed of the same materials at the same time. This example is preferably used for a color filter substrate for a color liquid crystal display using an IPS system.

Firstly, on a transparent substrate 11 on which a black matrix 12 with a predetermined pattern is formed, a red pattern 13R is formed in a red pattern-forming zone between black matrixes 12a in a display zone A and at the same time, a dummy colored layer 13R' is formed on a black matrix 12b in a zone B (see FIG. 7(A)). These formations can be formed by using the same manner as in the example shown in FIG. 6.

Next, a negative type transparent photosensitive resin layer 30 is formed on the substrate 11 so as to cover the substrate 11 in the same manner as in the example shown in FIG. 6 (see FIG. 7(B)). Then, the negative type transparent photosensitive resin layer 30 is exposed through a photomask M (see FIG. 7(C)). In succession, curing treatment of the transparent photosensitive resin layer 30 is performed either before or after the exposure so that the transparent photosensitive resin layer 30 in the unexposed region (regions other than the positions where the shielding member 14 and the columnar convex portion 18 are to be formed) is left in a desired thickness enough to form a transparent protective layer 15 in the developing step mentioned later. Examples of the curing treatment include a process in which the transparent photosensitive resin layer 30 is heated at a temperature enabling a curing reaction to proceed, for example, at a temperature higher than the prebaking temperature used in usual photolithography and a process in which the entire of the transparent photosensitive resin layer 30 is exposed at a predetermined exposure value smaller than that sufficient to cure the transparent photosensitive resin layer 30 completely.

By this curing treatment, a curing reaction is run enough in the portions (portions exposed through the photomask M) of the transparent photosensitive layer 30 where the shielding member 14 and columnar convex portion 18 are to be formed whereas a curing reaction is run in other positions (portions unexposed through the photomask M) to the extent that the transparent protective layer 15 can be formed.

Next, the transparent photosensitive resin layer 30 is developed using a developing solution. As outlined above, each optimum curing reaction is run in the region where the transparent protective layer 15 is to be formed and at the positions where the shielding member 14 and the columnar convex portion 18 are to be formed. By virtue of this phenomenon, the transparent photosensitive resin layer 30 at the positions where the shielding member 14 and the columnar convex portion 18 are to be formed is left undissolved. On the other hand, the transparent photosensitive resin layer 30 in other regions is almost dissolved and removed, but a thin film for the transparent protective layer 15 is left (see FIG. 7(D)). Thereafter, an oriented layer 17 is formed and predetermined curing treatment is performed to obtain a color filter substrate 2''' for an IPS color liquid crystal display.

Although, in the aforementioned production method, a negative type transparent photosensitive resin composition is used, a well-known positive type transparent photosensitive resin composition may be used like in the example shown in FIG. 6 to form the color filter substrate 2'''. In this case, as mentioned above, the black matrix 12, the colored layer 13 and the dummy colored layer 13R' are formed and thereafter a positive type transparent photosensitive resin layer is formed so as to cover these layers. Then, the positive type transparent photosensitive resin layer is subjected to photosensitivity-reduction treatment so that the transparent photosensitive resin in the exposed region (regions other than the positions where the shielding member 14 and the columnar convex portion 18 are to be formed) is left in a desired thickness enough to form the transparent protective layer 15. This treatment may be carried out by, for example, heating the transparent photosensitive resin layer at a temperature higher than the prebaking temperature used in usual photolithography. Then the positive type transparent photosensitive resin layer is exposed via a photomask for forming the shielding member 14 and the columnar convex portion 18 and developed. By this development, the positive type transparent photosensitive resin layer on the portions where the shielding member 14 and the columnar convex portion 18 are to be formed is left undissolved and the transparent photosensitive resin layer in other regions are almost dissolved and removed, but a thin film for the transparent protective layer 15 is formed.

In addition, the shielding member 14 and the columnar convex portion 18 may be formed by forming a transparent resin layer corresponding to each height required for the shielding member 14 and columnar convex portion 18 and forming a resist layer at the positions, where the shielding member 14 and the columnar convex portion 18 are formed, on the transparent resin layer, followed by etching to the extent that the transparent protective layer 15 is left.

When the shielding member, the columnar convex portion and the transparent protective layer are formed of the same materials in this manner, they can be formed at the same time by the method mentioned above. Therefore, a color filter substrate provided with the shielding member, the columnar convex portion and the transparent protective layer can be produced without carrying out a new additional step. This decreases the production cost and hence the resulting color liquid crystal display can be provided at a low price.

It is to be understood that the present invention is not limited to the aforementioned embodiments and these embodiments show a preferred form of the invention and any variation and modification having substantially the same structure and producing the same effect as the technical thought described in the claims of the present invention are involved in the technical scope of the present invention.

For instance, although a TFT active matrix system is used as the driving system in all of the aforementioned embodiments, the driving system of the color liquid crystal display of the present invention is not limited to this. The color liquid crystal display of the present invention may be those using a simple matrix system, a segment system or an active matrix system, using two terminal elements, such as an MIM (metal/insulated material/metal).

The color liquid crystal display of the present invention may be applied to various liquid crystal displays such as liquid crystal displays using a ferroelectric liquid crystal wherein the gap between an array substrate and a counter substrate is designed to be narrow, liquid crystal displays using an anti-ferroelectric liquid crystal, in-plain-switching type liquid crystal displays provided with a pixel electrode and a counter electrode on the side of an array substrate and liquid crystal displays having a structure provided with a color filter on the side of an array substrate.

EXAMPLES

The present invention will be hereinafter explained in more detail by way of examples.

1. Impurity-extraction Treatment Test

A. Production of Samples

A coating was formed on a glass substrate by using various materials which were utilized in color liquid crystal displays to make a sample, which was subjected to impurity-extraction treatment.

1) Coating Materials for Black Matrix and Coating Materials for Colored Layer

Photosensitive coating materials for black matrix and photosensitive coating materials for colored layer were those produced by adding beads to a dispersion composition (a pigment, a dispersant and a solvent) having the composition shown below, dispersing the composition for 3 hours by using a dispersing machine and thereafter mixing the dispersion, from which the beads were removed, with a clear resist composition (a polymer, a monomer, additives, an initiator and a solvent). As the dispersing machine, a paint shaker was used.

Next, the above photosensitive coating material for black matrix and photosensitive coating material for colored layer were respectively applied to a glass substrate in a thickness of 1.5 $\mu$m by a spin coating method, prebaked at 90° C. for 30 minutes, entirely exposed (500 mj/cm$^2$), subjected to spray development continued for 60 seconds by using an aqueous 0.05%KOH solution and post-baked at 200° C. for 30 minutes, to form a glass substrate with a coating.

2) Photosensitive Coating Materials for Protective Layer

A coating material for protective layer having the composition shown below was applied to a glass substrate to form a glass substrate with a coating in the same manner as in the case of the coating material for black matrix.

3) Photosensitive Coating Materials for Columnar Convex Portion

The photosensitive coating material for columnar convex portion which had the composition shown below was applied to a glass substrate by a spin coating method and prebaked (100° C., 3 minutes). Then, the coating material was entirely exposed, developed using a developing solution (0.01%KOH solution) and post-baked (200° C., 30 minutes), to form a glass substrate with a coating.

4) Composition of each Coating Material

TABLE 1

(1) Photosensitive coating material for black matrix (Bk1)

| | Names of materials or trademarks | Manufactures | Composition of sensitive material (wt. ratio) | Composition of dispersion (wt. ratio) | Composition of Clear resist (wt. ratio) |
|---|---|---|---|---|---|
| Black pigment | TM Black #9550 | Daiichi Seika Kogyo | 14.0 | 14.0 | — |
| Dispersant | Disperbyk 111 | BYK Chemie | 1.2 | 1.2 | — |
| Polymer | VR 60 | Showa Highpolymer | 2.8 | — | 2.8 |
| Monomer | SR 399 | Sartomer | 3.5 | — | 3.5 |
| Additive | L-20 | Soken Chemical | 0.7 | — | 0.7 |
| Initiator 1 | 2-Benzyl-2-dimethylamino-1-(4-morpholinophenyl)-butanone-1 | — | 1.6 | — | 1.6 |
| Initiator 2 | 4,4'-Diethyl-aminobenzophenone | — | 0.3 | — | 0.3 |
| Initiator 3 | 2,4-Diethylthioxantone | — | 0.1 | — | 0.1 |
| Solvent | Ethylene glycol monobutyl ether | — | 75.8 | 45.8 | 30.0 |

TABLE 2

(2) Photosensitive coating material for red pattern (R1)

| | Names of materials or trademarks | Manufactures | Composition of sensitive material (wt. ratio) | Composition of dispersion (wt. ratio) | Composition of Clear resist (wt. ratio) |
|---|---|---|---|---|---|
| Red pigment | Chromophthal Red A2B | Ciba Geigy | 4.8 | 4.8 | — |
| Yellow pigment | Paliotol Yellow D1819 | BASF | 1.2 | 1.2 | — |
| Dispersant | Solsperse 24000 | ZENECA | 3.0 | 3.0 | — |
| Monomer | SR399 | Sartomer | 4.0 | — | 4.0 |
| Polymer | Polymer 1 * | | 5.0 | — | 5.0 |
| Initiator 1 | Irgacure 907 | Ciba Geygy | 1.4 | — | 1.4 |
| Initiator 2 | 2,2-Bis(o-chlorophenyl)-4,5,4',5'-tetraphenyl-1,2'-biimidazole | | 0.6 | — | 0.6 |
| Solvent | Propylene glycol monomethyl ether acetate | — | 80.0 | 41.0 | 39.0 |

* Polymer 1: One produced by 16.9 mol % of 2-methachloyloxyethyl isocyanate is added to 100 mol % of a copolymer of benzylmethacrylate:styrene:acrylic acid:2-hydroxyethylmethacrylate = 15.6:37.0:30.5:16.9 (mol ratio) (weight average molecular weight: 42500)

TABLE 3

(3) Photosensitive coating material for green pattern (G1)

| | Names of materials or trademarks | Manufactures | Composition of sensitive material (wt. ratio) | Composition of dispersion (wt. ratio) | Composition of Clear resist (wt. ratio) |
|---|---|---|---|---|---|
| Green pigment | Monastral Green 9Y-C | ZENECA | 4.2 | 4.2 | — |
| Yellow pigment | Paliotol Yellow D1819 | BASF | 1.8 | 1.8 | — |
| Dispersant | Solsperse 24000 | ZENECA | 3.0 | 3.0 | — |
| Monomer | SR399 | Sartomer | 4.0 | — | 4.0 |
| Polymer | Polymer 1 * | | 5.0 | — | 5.0 |
| Initiator 1 | Irgacure 907 | Ciba Geygy | 1.4 | — | 1.4 |
| Initiator 2 | 2,2-Bis(o-chlorophenyl)-4,5,4',5'-tetraphenyl-1,2'-biimidazole | — | 0.6 | — | 0.6 |
| Solvent | Propylene glycol monomethyl ether acetate | — | 80.0 | 41.0 | 39.0 |

* Polymer 1: the same as that in Table 2

TABLE 4

(4) Photosensitive coating material for green pattern (G2)

|  | Names of materials or trademarks | Manufactures | Composition of sensitive material (wt. ratio) | Composition of dispersion (wt. ratio) | Composition of Clear resist (wt. ratio) |
|---|---|---|---|---|---|
| Green pigment | Monastral Green 6Y-C | ZENECA | 4.2 | 4.2 | — |
| Yellow pigment | Paliotol Yellow D1819 | BASF | 1.8 | 1.8 | — |
| Dispersant | Solsperse 24000 | ZENECA | 3.0 | 3.0 | — |
| Monomer | SR399 | Sartomer | 4.0 | — | 4.0 |
| Polymer | Polymer 1 * | — | 5.0 | — | 5.0 |
| Initiator 1 | Irgacure 907 | Ciba Geygy | 1.4 | — | 1.4 |
| Initiator 2 | 2,2-Bis(o-chlorophenyl)-4,5,4',5'-tetraphenyl-1,2'-biimidazole | — | 0.6 | — | 0.6 |
| Solvent | Propylene glycol monomethyl ether acetate | — | 80.0 | 41.0 | 39.0 |

* Polymer 1: the same as that in Table 2

TABLE 5

(5) Photosensitive coating material for blue pattern (B1)

|  | Names of materials or trademarks | Manufactures | Composition of sensitive material (wt. ratio) | Composition of dispersion (wt. ratio) | Composition of Clear resist (wt. ratio) |
|---|---|---|---|---|---|
| Blue pigment | Heliogen Blue L-6700F | BASF | 6.0 | 6.0 | — |
| Pigment derivative | Solsparse 12000 | ZENECA | 0.6 | 0.6 | — |
| Dispersant | Solsperse 24000 | ZENECA | 2.4 | 2.4 | — |
| Monomer | SR399 | Sartomer | 4.0 | — | 4.0 |
| Polymer | Polymer 1 * | — | 5.0 | — | 5.0 |
| Initiator 1 | Irgacure 907 | Ciba Geygy | 1.4 | — | 1.4 |
| Initiator 2 | 2,2-Bis(o-chlorophenyl)-4,5,4',5'-tetraphenyl-1,2'-biimidazole | — | 0.6 | — | 0.6 |
| Solvent | Propylene glycol monomethyl ether acetate | — | 80.0 | 41.0 | 39.0 |

* Polymer 1: the same as that in Table 2

TABLE 6

(6) Photosensitive Coating material for protective layer (OC1)

|  | Names of materials or trademarks | Manufactures | Composition of sensitive material (wt. ratio) |
|---|---|---|---|
| Monomer | SR399 | Sartomer | 7.1 |
| Polymer | Polymer 1 * | — | 8.8 |
| Epoxy resin | Epicoat 180S70 | Yuka Shell Epoxy | 9.7 |
| Initiator 1 | Irgacure 907 | Ciba Geygy | 1.4 |
| Initiator 2 | 2,2-Bis(o-chlorophenyl)-4,5,4',5'-tetraphenyl-1,2'-biimidazole | — | 1.0 |
| Solvent 1 | Dimethyl glycol | — | 38.0 |
| Solvent 2 | Acetic acid-3-methoxybutyl | — | 34.0 |

* Polymer 1: the same as that in Table 2

TABLE 7

(7) Photosensitive coating material for columnar convex portion (S1)

|  | Names of materials or trademarks | Manufactures | Composition of sensitive material (wt. ratio) |
|---|---|---|---|
| Monomer | SR399 | Sartomer | 8.7 |
| Polymer | Polymer 1 * | — | 10.9 |
| Epoxy resin | Epicoat 180S70 | Yuka Shell Epoxy | 12.1 |
| Surfactant | Nonion HS-210 | Japan Yuka | 1.0 |
| Initiator 1 | Irgacure 369 | Ciba Geygy | 1.2 |
| Initiator 2 | 2,2-Bis(o-chlorophenyl)-4,5,4',5'-tetraphenyl-1,2'-biimidazole | — | 1.0 |
| Solvent 1 | Propylene glycol monomethyl ether acetate | — | 29.1 |
| Solvent 2 | Acetic acid-3-methoxybutyl | — | 36.0 |

* Polymer 1: the same as that in Table 2

TABLE 8

(8) Photosensitive coating material for columnar convex portion (S2)

| | Names of materials or trademarks | Manufactures | Composition of sensitive material (wt. ratio) |
|---|---|---|---|
| Monomer | SR399 | Sartomer | 8.7 |
| Polymer | Polymer 1 * | — | 10.9 |
| Epoxy resin | Epicoat 180S70 | Yuka Shell Epoxy | 12.1 |
| Surfactant | Nonion HS-210 | Japan Yuka | 2.0 |
| Initiator 1 | Irgacure 369 | Ciba Geygy | 1.2 |
| Initiator 2 | 2,2-Bis(o-chlorophenyl)-4,5,4',5'-tetraphenyl-1,2'-biimidazole | — | 1.0 |
| Solvent 1 | Propylene glycol monomethyl ether acetate | — | 28.1 |
| Solvent 2 | Acetic acid-3-methoxybutyl | — | 36.0 |

* Polymer 1: the same as that in Table 2

B. Impurity-extraction Treatment

Each glass substrate with a coating, which substrate had a surface area of 4 cm², as the sample made in A. was immersed in a liquid crystal material having a volume of 0.2 ml, which was kept at 105° C. for 5 hours to carry out impurity-extraction treatment. As the liquid crystal, the same one that was explained in the first embodiment was used.

C. Measurement of the Characteristics of a Liquid Crystal Material

Each liquid crystal which had been subjected to impurity-extraction treatment was injected into a measuring cell having the following layer structure:
substrate/electrode/oriented layer/liquid crystal/oriented layer/electrode/substrate, to measure the voltage retention and residual DC of each liquid crystal by using the measuring conditions for voltage retention and residual DC described in the first embodiment. The results are shown in Table 9.

TABLE 9

| Liquid crystal material | Voltage retention (%) | Residual DC (V) |
|---|---|---|
| Liquid crystal material obtained by extracting Bk1 | 80 | 0.40 |
| Liquid crystal material obtained by extracting R1 | 93 | 0.04 |
| Liquid crystal material obtained by extracting G1 | 95 | 0.01 |
| Liquid crystal material obtained by extracting G2 | 85 | 0.81 |
| Liquid crystal material obtained by extracting B1 | 94 | 0.05 |
| Liquid crystal material obtained by extracting OC1 | 95 | 0.01 |
| Liquid crystal material obtained by extracting S1 | 95 | 0.01 |
| Liquid crystal material obtained by extracting S2 | 75 | 0.60 |

It is clarified from the results of the impurity-extraction treatment test as shown Table 9 that the photosensitive material for green pattern G2 and the photosensitive material for columnar convex portion S2 adversely affect the liquid crystal material.

2. Actual Display Test Using a Color Liquid Crystal Display

Color liquid crystal displays were produced using the above various coating materials which had been subjected to impurity-extraction test to measure the display qualities of these color liquid crystal displays. The combinations of the coating materials used and the results of evaluation of the display qualities in each combination are shown in Table 10.

TABLE 10

| | | Colored layer | | | Protective layer | Columnar convex portion | Shielding member | Evaluation of display qualities |
|---|---|---|---|---|---|---|---|---|
| | Black matrix | Red pattern | Green pattern | Blue pattern | | | | |
| Sample 1 | Bk1 | R1 | G1 | B1 | None | None | Laminate of R1, G1 and B1 | good |
| Sample 2 | Bk1 | R1 | G2 | B1 | None | None | Laminate of R1, G2 and B1 | not good |
| Sample 3 | Bk1 | R1 | G2 | B1 | OC1 | None | Laminate of R1, G2 and B1 | good |
| Sample 4 | Bk1 | R1 | G2 | B1 | OC1 | S1 | S1 | good |
| Sample 5 | Bk1 | R1 | G2 | B1 | OC1 | S2 | S2 | not good |

The shielding members in the samples 1 to 3 in Table 10 were formed by laminating three dummy colored layers used in the example shown in FIG. 5. The protective layer in the example 3 was formed so as to cover the shielding member. In the samples 4 and 5, the columnar convex portion and the shielding member were made of the same materials at the same time like in the aforementioned example shown in FIG. 4. In the case of this example, since the columnar convex portion and the shielding member were formed at the same time after the protective layer was formed, the protective layer was formed so as not to cover the shielding member.

In the rating of the display qualities in Table 10, "good" shows that neither seizure nor white unevenness occurred and "not good" shows that either one or both of these phenomena occurred.

As is clear from Table 10, when G2 and S2 which did not fulfill the aforementioned requirements in the above impurity-extraction treatment test were used as the material for the shielding member in the condition that they were in contact with the liquid crystal material of the liquid crystal layer, a problem concerning the display qualities of the color liquid crystal display was posed. From this fact, it is understood that a color liquid crystal display having better display quality can be obtained by making the aforementioned impurity-extraction treatment test to select a material fulfilling the aforementioned requirements and forming at least a portion of the shielding material which is in contact with a liquid crystal material in a liquid crystal layer by using the selected material.

What is claimed is:

1. A color liquid crystal display comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member and a shielding member arranged between the sealing member and the display zone to prevent the liquid crystal material contained in the liquid crystal layer from being contaminated with contaminants from the sealing member, and formed of a material which works such that the voltage retention and residual DC ($\Delta E$) of the liquid crystal material after the impurity-extraction treatment is 80% or more and 0.5 V or less respectively.

2. A color liquid crystal display according to claim 1, wherein the shielding member is formed of a material which does not contain pigments, pigment derivatives, dyes or dye derivatives.

3. A color liquid crystal display according to claim 1, wherein the shielding member is formed on a transparent electrode.

4. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion wherein the shielding member is formed of a material which works such that the voltage retention and residual DC ($\Delta E$) of the liquid crystal material after the impurity-extraction treatment is 80% or more and 0.5 V or less respectively.

5. A color liquid crystal display according to claim 4, wherein the shielding member is formed of the same material as the columnar convex portion and a protective layer.

6. A color liquid crystal display according to claim 5, wherein at least a part of the shielding member is formed on a black matrix disposed outside of the display zone.

7. A color liquid crystal display according to claim 5, wherein at least a part of the shielding member is formed on at least one dummy colored layer formed on a black matrix disposed outside of the display zone.

8. A color liquid crystal display according to claim 5 wherein the shielding member is formed on a transparent electrode.

9. A color liquid crystal display according to claim 4, wherein at least a part of the shielding member is formed on a black matrix disposed outside of the display zone.

10. A color liquid crystal display according to claim 9 wherein the shielding member in the vicinity of a liquid crystal-sealing port and/or a straightening vane of a liquid crystal-sealing port is produced by forming a convex portion formed of the same material as the columnar convex portion on at least one dummy colored layer formed on the black matrix.

11. A color liquid crystal display according to claim 4, wherein at least a part of the shielding member is formed on at least one dummy colored layer formed on a black matrix disposed outside of the display zone.

12. A color liquid crystal display according to claim 11 wherein the shielding member in the vicinity of a liquid crystal-sealing port and/or a straightening vane of a liquid crystal-sealing port is produced by forming a convex portion formed of the same material as the columnar convex portion on at least one dummy colored layer formed on the black matrix.

13. A color liquid crystal display according to claim 4, wherein the shielding member is formed on a transparent electrode.

* * * * *

UNITED STATES PATENT AND TRADEMARK OFFICE
CERTIFICATE OF CORRECTION

PATENT NO. : 6,414,733 B1
DATED : July 2, 2002
INVENTOR(S) : Keizo Ishikawa et al.

It is certified that error appears in the above-identified patent and that said Letters Patent is hereby corrected as shown below:

<u>Title page, Item [54] and Column 1, lines 2 thru 4,</u>
Delete "BEING ARRANGED BETWEEN SEALING MEMBER AND DISPLAY ZONE" to read -- COLOR LIQUID CRYSTAL DISPLAY WITH SHIELDING MEMBER --.

<u>Column 28,</u>
Line 42, after claim 13, add the following claims 14-21:
--

14. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein at least a part of the shielding member is formed on a black matrix disposed outside of the display zone.

15. A color liquid crystal display, comprising at least a color filter substrate provided with a colored layer with plural colors formed into a predetermined pattern in a display zone on a transparent substate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein the shielding member is formed of the same material as the columnar convex portion and a protective layer, and at least a part of the shielding member is formed on a black matrix disposed outside of the display zone.

UNITED STATES PATENT AND TRADEMARK OFFICE
CERTIFICATE OF CORRECTION

PATENT NO. : 6,414,733 B1
DATED : July 2, 2002
INVENTOR(S) : Keizo Ishikawa et al.

It is certified that error appears in the above-identified patent and that said Letters Patent is hereby corrected as shown below:

<u>Column 28 Cont'd,</u>

16. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein at least a part of the shielding member is formed on at least one dummy colored layer formed on a black matrix disposed outside of the display zone.

17. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein the shielding member is formed of the same material as the columnar convex portion and a protective layer, and at least a part of the shielding member is formed on at least one dummy colored layer formed on a black matrix disposed outside of the display zone.

18. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein the shielding member is formed on a transparent electrode.

19. A color liquid crystal display according to Claim 14, wherein the shielding member in the vicinity of a liquid crystal-sealing port and/or a straightening vane of a liquid crystal-sealing port is produced by forming a convex portion formed of the same material as the columnar convex portion on at least one dummy colored layer formed on the black matrix.

UNITED STATES PATENT AND TRADEMARK OFFICE
CERTIFICATE OF CORRECTION

PATENT NO. : 6,414,733 B1
DATED : July 2, 2002
INVENTOR(S) : Keizo Ishikawa et al.

It is certified that error appears in the above-identified patent and that said Letters Patent is hereby corrected as shown below:

<u>Column 28 Cont'd,</u>

20. A color liquid crystal display according to Claim 16, wherein the shielding member in the vicinity of a liquid crystal-sealing port and/or a straightening vane of a liquid crystal-sealing port is produced by forming a convex portion formed of the same material as the columnar convex portion on at least one dummy colored layer formed on the black matrix.

21. A color liquid crystal display, comprising at least a color filter substrate provided with a colored layer with plural colors formed into a predetermined pattern in a display zone on a transparent substrate, a counter electrode substrate disposed opposite to and with a predetermined gap from the color filter substrate, a sealing member arranged outside of the display zone to seal the gap formed between the both substrates, a liquid crystal layer formed by filling a liquid crystal material in the gap formed between the both substrates and sealed by the sealing member, a columnar convex portion formed so as to keep the gap between the both substrates constant and a shielding member arranged between the sealing member and the display zone to prevent the liquid crystal material of the liquid crystal layer from being contaminated with contaminants from the sealing member and formed of the same material as the columnar convex portion, wherein the shielding member is formed of the same material as the columnar convex portion and a protective layer, and the shielding member is formed on a transparent electrode.

--

Signed and Sealed this

Twenty-sixth Day of August, 2003

JAMES E. ROGAN
*Director of the United States Patent and Trademark Office*